United States Patent [19]

Tsugawa

[11] Patent Number: 4,894,613
[45] Date of Patent: Jan. 16, 1990

[54] INDUCTIVE SPEED SENSOR HAVING SWITCHING HYSTERESIS FOR INCREASING THE MAGNITUDE OF A PHASE SHIFT

[75] Inventor: Terumi Tsugawa, Fountain Valley, Calif.

[73] Assignee: Hamilton Standard Controls, Inc., Farmington, Conn.

[21] Appl. No.: 240,783

[22] Filed: Sep. 2, 1988

[51] Int. Cl.[4] .............................................. G01P 3/48
[52] U.S. Cl. .................................... 324/173; 324/166
[58] Field of Search ................ 324/207, 208, 160–180; 340/870.31; 310/168, 155

[56] References Cited

U.S. PATENT DOCUMENTS

| 3,641,535 | 2/1972 | Knopf | 324/165 X |
| 3,716,787 | 2/1973 | Hammond | 324/173 |
| 3,721,859 | 3/1973 | Blanyer | 324/173 X |
| 3,728,565 | 4/1973 | O'Callaghan | 324/165 X |
| 3,750,128 | 7/1973 | Sapir | 324/166 X |
| 3,758,858 | 9/1973 | McCue | 324/166 |
| 4,161,693 | 7/1979 | Carlson | 324/173 |
| 4,764,685 | 8/1988 | Bleckmann et al. | 324/161 X |

Primary Examiner—Reinhard J. Eisenzopf
Assistant Examiner—Warren S. Edmonds

[57] ABSTRACT

A speed detector, for use with a tone wheel having metal teeth, employs two coils positioned in offset relation near the tone wheel for interacting with the tone wheel teeth and thus changing their respective inductances. One coil is in a phase sense oscillator circuit and the other is in a tuned sensor network. The oscillator is coupled to, and drives, the tuned network. The change in coil inductances effects a shifting of the phase of the output signal from the oscillator relative to the output signal from the tuned network. The phase sequence of those two output signals also reverses itself cyclically as the tone wheel rotates, and a phase reversal detector detects that reversal and uses the event to provide timing reference pulses for a final determination of speed. The speed detector has a hysteresis circuit connected between the phase reversal detector and the oscillator or the tuned network for automatically increasing the apparent phase shift between the oscillator and tuned circuit output signals to minimize invalid timing signals as a result of limited backward motion of the tone wheel. The hysteresis circuit includes a resistor and preferably a series diode.

6 Claims, 5 Drawing Sheets

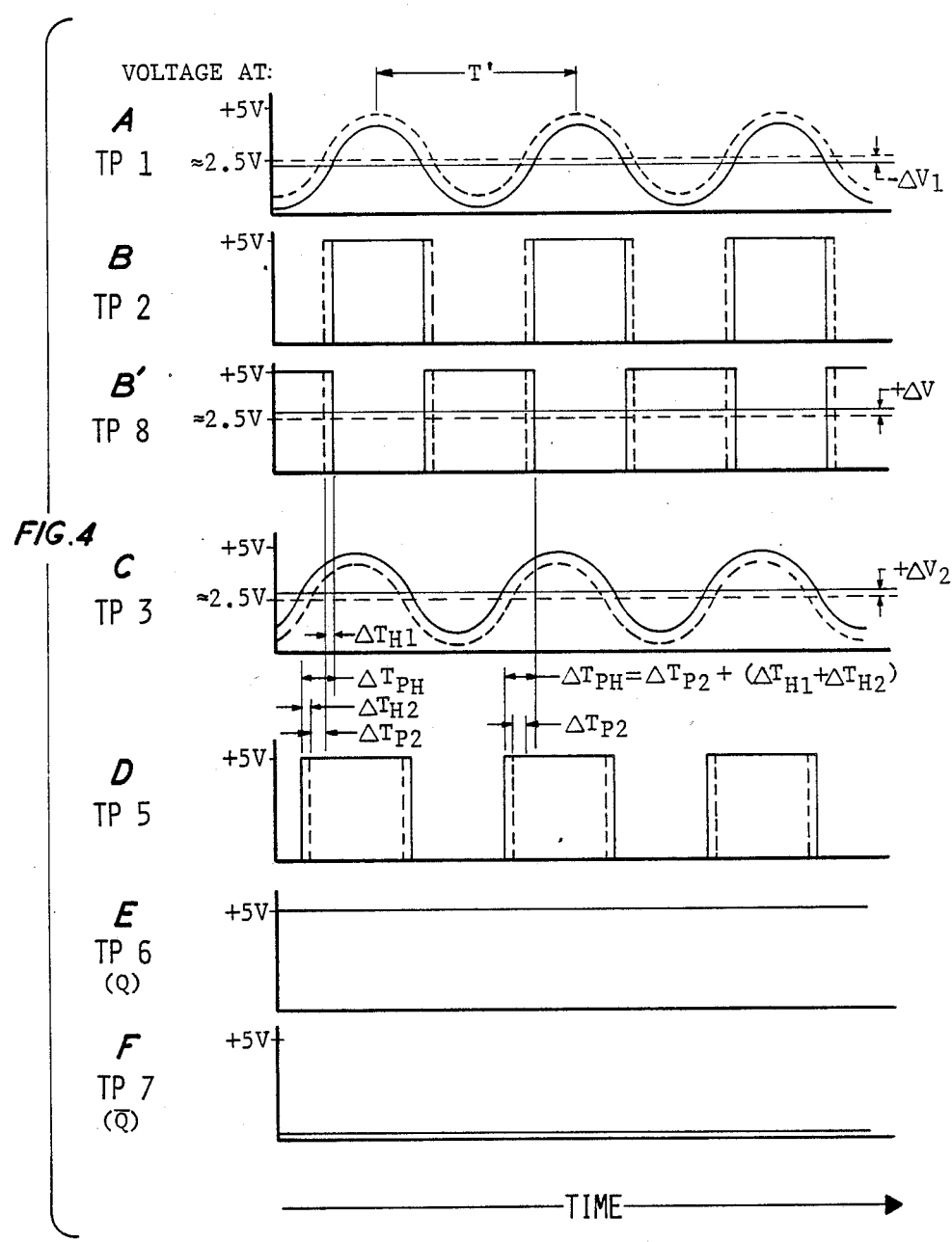

INDUCTIVE SPEED SENSOR HAVING SWITCHING HYSTERESIS FOR INCREASING THE MAGNITUDE OF A PHASE SHIFT

CROSS-REFERENCE TO RELATED APPLICATIONS

This application is related to U.S. Ser. No. 07/240,782 (HCI-386) and to U.S. Ser. No. 07/240,785 (HCI-384), filed on even date herewith.

TECHNICAL FIELD

The invention relates to speed sensors or detectors and more particularly to inductive speed detector apparatus. More particularly still, the invention relates to the provision of improved circuitry for such speed detectors.

BACKGROUND ART

Speed sensors, or detectors of various types are well known. In recent years the application of speed detectors to automotive display and automotive control functions has stimulated increased demands on and sophistication, of those sensors. In one common configuration, the speed sensor is placed in non-contacting relation with a member having reference points or teeth, the relative motion therebetween is detected by the sensor and associated circuitry provides at least timing reference signals and may ultimately provide an indication of the relevant speed. Usually, the sensor is fixedly positioned and the moving member is a toothed wheel, or so called "tone wheel", which rotates at a speed which is a known function of the speed to be measured.

One often used class of speed sensors employs one or more sense coils positioned in proximity with the rotating teeth of a tone wheel for exploiting either magnetic or eddy current effects depending on whether or not magnetic materials are present in the teeth.

One sensor of the aforementioned general type is disclosed in U.S. Pat. No. 3,716,787 by Peter W. Hammond. In that reference, there is disclosed a speed monitoring device having a phase measurement circuit which is utilized to measure the changes in the inductance of a sensor coil as affected by the proximity of magnetically distinct pins on a tone wheel. The relative increase and decrease in spacing between tone wheel pins, or teeth, and the spaces between such teeth with respect to the sensor coil serves to vary the impedance or inductance of that coil in a tuned circuit in which it is included. Such variation in the impedance effects a circuit phase-shift with respect to a predetermined reference phase of voltage and current in the circuit to indicate movement of the wheel and a measurement of the speed of movement in a measured time interval.

Another U.S. Pat. No. 3,750,128 to Said Sapir discloses a pulse generator which produces output pulses at a pulse repetition frequency directly proportional to the wheel velocity. The output pulses may be used in a conventional anti-skid braking system. The pulse generator is operative even at low velocities since it employs an oscillator-energized variable reluctance transformer.

Yet another device for sensing speed is disclosed in U.S. Pat. No. 3,728,565 to Gerald O'Callaghan. That reference discloses first and second spaced apart stator windings positioned near a rotating tone wheel. Respective sinusoidal voltages are induced in each of the stator windings and the magnitude of those voltages is indicative of the speed.

With respect to the U.S. Pat. No. 3,728,565 reference, it will be appreciated that the system is dependent upon the speed of rotation of the tone wheel for an amplitude signal to provide a corresponding speed signal. Such systems are inherently limited, particularly with respect to low speeds of operation and/or variations in the signal magnitude occasioned by other than speed alone. It is also desirable that the sensor operate over a relatively wide gap between it and the tone wheel, however, amplitude-dependent systems exhibit characteristic weaknesses in that regard. Though the U.S. Pat. Nos. 3,716,787 and 3,750,128 references are not dependent upon some minimum speed of the tone wheel for operability since they rely upon phase-shift techniques, they do possess other limitations. For instance, with respect to U.S. Pat. No. 3,716,787, the phase shift in the circuit containing the sensing coil is determined relative to a fixed reference signal from the oscillator which drives the sensing coil circuit. Since the reference signal has a fixed frequency, the circuit containing the sensing coil is capable of only a limited relative phase shift. Such limitation generally requires a relatively strong interaction between the tone wheel and the coil and circuitry to provide a desired response. In U.S. Pat. No. 3,750,128 a transformer interacts with the tone wheel and with a rectangular wave generator to create the requisite phase shifts.

One recent inductive speed sensor which has been developed to overcome some of the short-comings of the aforementioned prior art is disclosed and claimed in the aforementioned companion application Ser. No. 07/240,782 (HCI-386) of Welcome and Sparks filed on even date herewith and assigned to the same assignee as the present application. The disclosure of that application is incorporated herein by reference. That inductive speed sensor employs two coils, typically each associated with respective iron cores, for magnetically interacting with the teeth and slots of a tone wheel for speed detection. In the event the teeth are of a nonferromagnetic material, the interaction is based on eddy current principles.

The circuitry associated with those two coils comprises a phase sense oscillator incorporating one of the coils and a tuned sensor network incorporating the other coil. The frequency of the phase sense oscillator is varied as a function of the instantaneous inductance of its respective coil, which is in turn determined by its present positioning relative to the teeth and slots of the tone wheel. Although the phase sense oscillator drives the tuned sensor network bearing the sensor coil, that second coil is displaced from the first such that the inductive changes to it as a result of the passing teeth and slots are normally out-of-phase with those affecting the first coil. The resulting signals from the phase sense oscillator and the tuned sensor network are typically phase shifted by varying amounts, however, that phase will reverse itself twice during rotation of the tone wheel through an angle $\theta$ commensurate with the pitch between successive teeth on the tone wheel. Further, phase condition detection circuitry associated with the inductive speed detector monitors the signals provided by the phase sense oscillator and the tuned sensor network to detect the instant at which the relative phases of the two signals reverse relative to one another. That event is indicative of some fixed position on the tone wheel and accordingly, is repeatable as the tone wheel rotates for generating timing reference pulses.

A potential problem associated with various inductive speed detectors, and particularly those relying on phase shift principles, resides in the possible generation of unwanted output timing reference signals as a result of a small amount of reverse rotation, or backlash, of the tone wheel which may be generated by mechanical vibration, either when the wheel is in a nonrotating state or is rotating at an extremely slow speed. Although that reverse rotation may be of relatively small amplitude, it may nonetheless be sufficient to be detected as a reversal of the phase sequence between the signals and thus be incorrectly interpreted as a valid timing reference pulse.

Although the aforementioned U.S. Pat. No. 3,716,787 does disclose the provision of a hysteresis effect in its particular circuit to overcome some of the foregoing limitations, it does so by use of a feedback arrangement which relies upon scaling resistors to establish a threshold level against which the oscillating signal derived from the signal sensor is compared in the generation of a digital signal level for controlling the output flip-flop device. While the provision of hysteresis in that manner for that particular configuration of sensing circuit may be acceptable, it is preferable to minimize the number of components in the hysteresis circuit which may experience variances in their tolerances. Moreover, it is desirable to provide an effective and optimal hysteresis control for a speed detector of the type employing two inductive sensing coils and respective associated circuitry.

Accordingly, it is a principal object of the invention to provide an improved speed detector apparatus which is operative at all speeds, yet is relatively insensitive to some vibration in the tone wheel at low speed conditions. Included within this object is the provision of a hysteresis effect in a manner which is relatively economical and reliable, particularly in a circuit employing two sensor coils.

DISCLOSURE OF THE INVENTION

According to the invention there is provided an improved speed detector apparatus for use in combination with a tone wheel having multiple metal teeth and which is susceptible to relative backward displacement due to backlash or vibration. The apparatus includes an oscillator, a tuned circuit interconnected with the oscillator and phase shift condition detection means coupled to the oscillator and the tuned circuit. The oscillator comprises a first inductive sensing coil adapted to be positioned adjacent to passing teeth on the tone wheel to thereby change its inductance, the frequency of the oscillator being determined at least partly by the inductance of the first coil. The tuned circuit interconnected with the oscillator comprises a second inductive sensing coil, that tuned circuit being driven by the oscillator and the second inductive sensing coil being adapted to be positioned adjacent to passing teeth on the tone wheel. The first and second inductive sensing coils are offset from one another relative to the passing teeth on the tone wheel such that their respective changes of inductance are relatively out-of-phase. The ouput signals of the oscillator and the tuned circuit cyclically shift phase as the tone wheel is displaced. Moreover, their relative phases also reverse. A phase reversal detector detects the reversal of the phase sequence between the oscillator and the tuned circuit and provides timing pulses recurring at a frequency representative of the speed of the tone wheel. A hysteresis circuit, connected between the phase-reversal detector and the oscillator or the tuned circuit, automatically adjusts the DC voltage of the respective oscillator and/or tuned circuit upon detection of phase reversal to increase the magnitude of the phase shift.

The oscillator and the tuned circuit each include means, as for instance an inverter amplifier, for providing their respective output signals as a digital waveform, and the duty cycle of the digital waveform is at least partly a function of the DC voltage of the respective oscillator and tuned circuit. By decreasing the DC voltage in the oscillator, the width of its digital waveform output will decrease. In one embodiment, that signal is further inverted in the oscillator and the resulting widened signal is connected to the tuned circuit to increase its DC voltage level and correspondingly increase the width of its digital waveform output signal. The resulting changes in output signal "width" operate to increase the apparent phase shift between the signals, and thereby provides the desired hysteresis.

In another embodiment which employs comparators instead of the inverters, the apparent phase shift between the two digital output signals may again be increased by adjusting, and specifically decreasing, the DC voltage in the coupled circuits of oscillator and the tuned circuit.

The phase-reversal detector may be a D-type flip-flop and the hysteresis circuit may include a diode or the like, in series with a current-limiting resistor, and preferably connected between the oscillator and an appropriate output of the flip-flop to selectively drain current from the oscillator to adjust its DC voltage level.

Other features and advantages will be apparent from the specification and claims and from the accompanying drawings which illustrate an embodiment of the invention.

BRIEF DESCRIPTION OF THE DRAWINGS

FIG. 4 (including 4B') depicts various waveforms at various test points in the circuit of FIG. 2 for the broken-line positioning of the tone wheel in FIG. 2, both with and without the hysteresis circuitry of the invention.

BEST MODE FOR CARRYING OUT THE INVENTION

As mentioned previously, the speed detector of the present invention is either similar or identical in many respects with that described in the aforementioned application U.S. Ser. No. 07/240782 (HCI-386) to which reference may be made for additional detail not inconsistent herewith and which is incorporated herein by reference.

Figure 1:
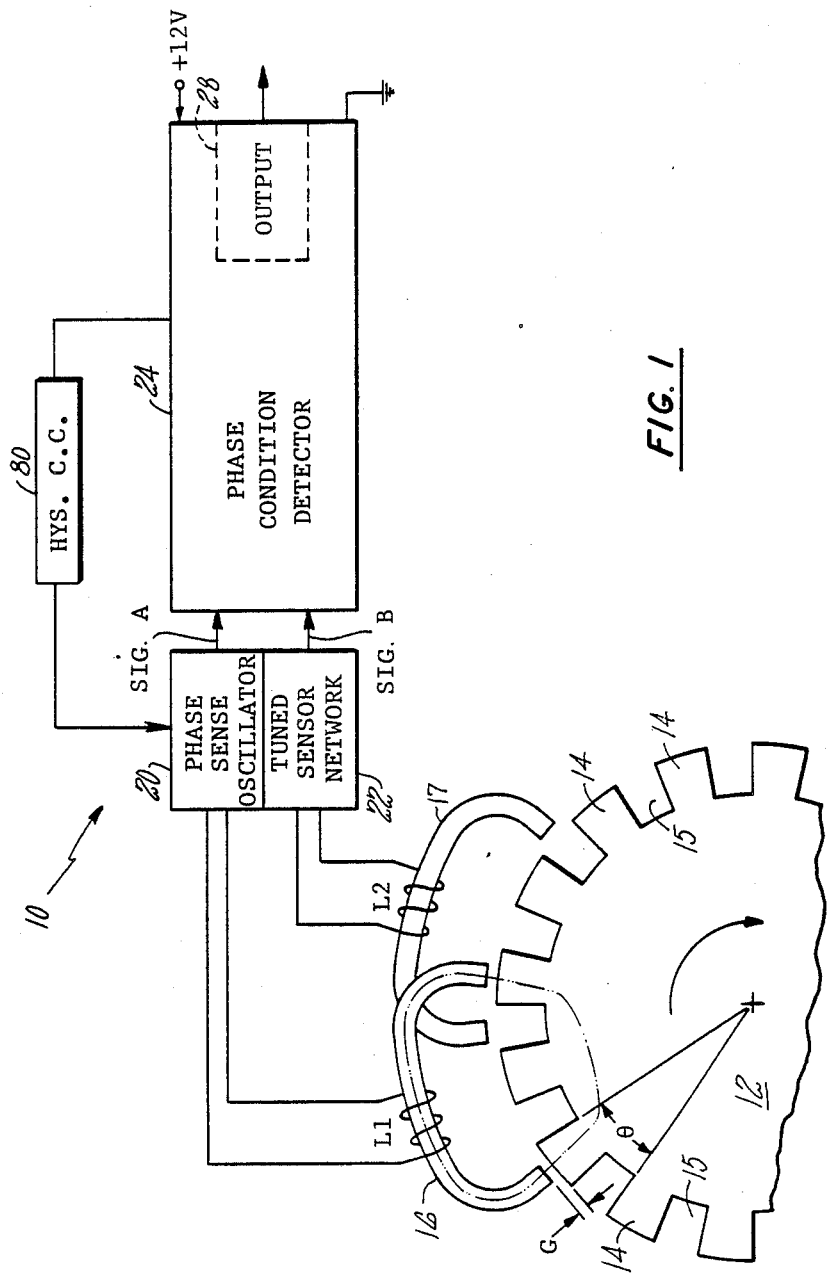
FIG. 1 depicts, partly in block diagrammatic form, the speed detector of the invention operatively disposed adjacent a tone wheel and including a hysteresis control circuit.

Referring to FIG. 1 there is depicted in diagrammatic form, a speed detector 10 operatively positioned adjacent a tone wheel 12. The tone wheel 12, and more particularly the pins or teeth 14 thereof, are formed of a metal which will interact with the speed detector 10. Typically, though not necessarily, the entire wheel 12 will be formed of the same material as the teeth 14. In the present instance, the wheel 12 and teeth 14 are formed of a ferromagnetic material, such as steel, for magnetic interaction with the speed detector 10. However, the teeth 14 in wheel 12 might alternatively be formed of a nonmagnetic, metallic material, as for instance aluminum, which will similarly work with the speed detector 10 of the invention, but instead employing eddy current principles which invert the effect. The tone wheel 12 rotates in the direction indicated by the arrow. Its speed of rotation is typically correlated with the speed of some other member, the speed of which is ultimately to be determined. Tone wheel 12 may typically be associated with some other rotating part, as for instance a wheel or some associated rotating portion of the drive train of an automobile, as for use in anti-skid brake control devices.

The typical tone wheel 12 is provided with a relatively large number of teeth 14 separated by respective intermediate spaces or slots 15. The pitch $\theta$ between the same point on successive teeth 14 is uniform about tone wheel 12. Assuming tone wheel 12 has 72 teeth, $\theta$ will have a value of 5°. The angular extent of the slot 15 may be comparable to that of a respective tooth 14, but need not be, in order for the speed detector 10 to be operative.

Referring to the diagram of speed detector 10 in FIG. 1, a pair of iron-cored coils L1 and L2 provide the physical sensing components which directly interact with the tone wheel 12. The iron cores 16 and 17 respectively associated with coils L1 and L2 are made of magnetic material and, may preferably have a "C" or "U" shape. In one instance, the cores 16, 17 were formed of alloys of iron, nickel, and other materials utilized in the form of a thin tape wound on a nonmagnetic bobbin to form a toroid, which was then cut through its diameter to provide the requisite "C" shape. The coils L1 and L2 were then respectively wound on the respective core 16 and 17. The inclusion of cores 16, 17 serves to confine and transport the flux associated with the coils L1 and L2 and thus allows some control of the magnetic flux near a respective tooth 14. It will be appreciated that the configuration of the cores 16, 17 may be modified substantially without departing from the principles of the invention.

In accordance with the invention, it is important that the sensing coils L1 and L2 be offset from one another relative to the passing teeth 14 on tone wheel 12 such that the change affecting or induced in each coil is relatively offset or out of phase with that of the other. For instance, in FIG. 1 each core 16, 17 is oriented with one end face of the core being angularly downstream of the other end of that same core with respect to the direction of rotation of tone wheel 12. Further, the angular span of each core 16, 17 is depicted as being an integral multiple of interval $\theta$, in this instance two teeth or $2\theta$ still further and of particular importance, core 16 is angularly offset with respect to core 17 such that the inductive changes occasioned in their respective coils L1 and L2 are typically out of phase or offset. For instance, it will be noted that core 16 associated with coil L1 is shown having its opposite ends disposed over the end faces of a pair of teeth 14, whereas the opposite end faces of core 17 are at that same instant disposed over slots 15. When a current flows in the windings, L1 and L2, a flux path is established through the respective core 16, 17 and across the air gap and into the tone wheel 12. This flux path is known as the magnetic circuit. The magnetic circuit is tightly coupled when the opposite ends of a core are aligned with the end face of a tooth 14, as depicted for core 16 in FIG. 1 and further demonstrated by the dotted flux path. Similarly, the flux path is weak when the ends of the core are adjacent a space 15, as depicted for core 17 in FIG. 1.

It is desirable that the speed detector 10 be capable of reliable and accurate operation for relatively large air gap distances, "G", between the end face of a tooth 14 and the end face of a core 16, 17. Moreover, it is desirable that detector 10 be as insensitive as possible to changes in the air gap "G" as might be occasioned thermally or by the introduction of dirt and/or corrosion. In the present instance, the detector 10 is capable of reliable operation for a gap spacing of 0.1 inch and in some instances, greater.

Further in FIG. 1, there is depicted in block diagram form, a phase sense oscillator 20, a tuned sensor network 22, a phase condition detector 24 and a hysteresis control circuit 80. Additionally, a voltage regulating circuit may be associated with detector 10. The phase condition detector 24 is shown as including, within broken lines, optional output circuitry 28 which may vary somewhat with respect to its function and configuration.

Figure 2:
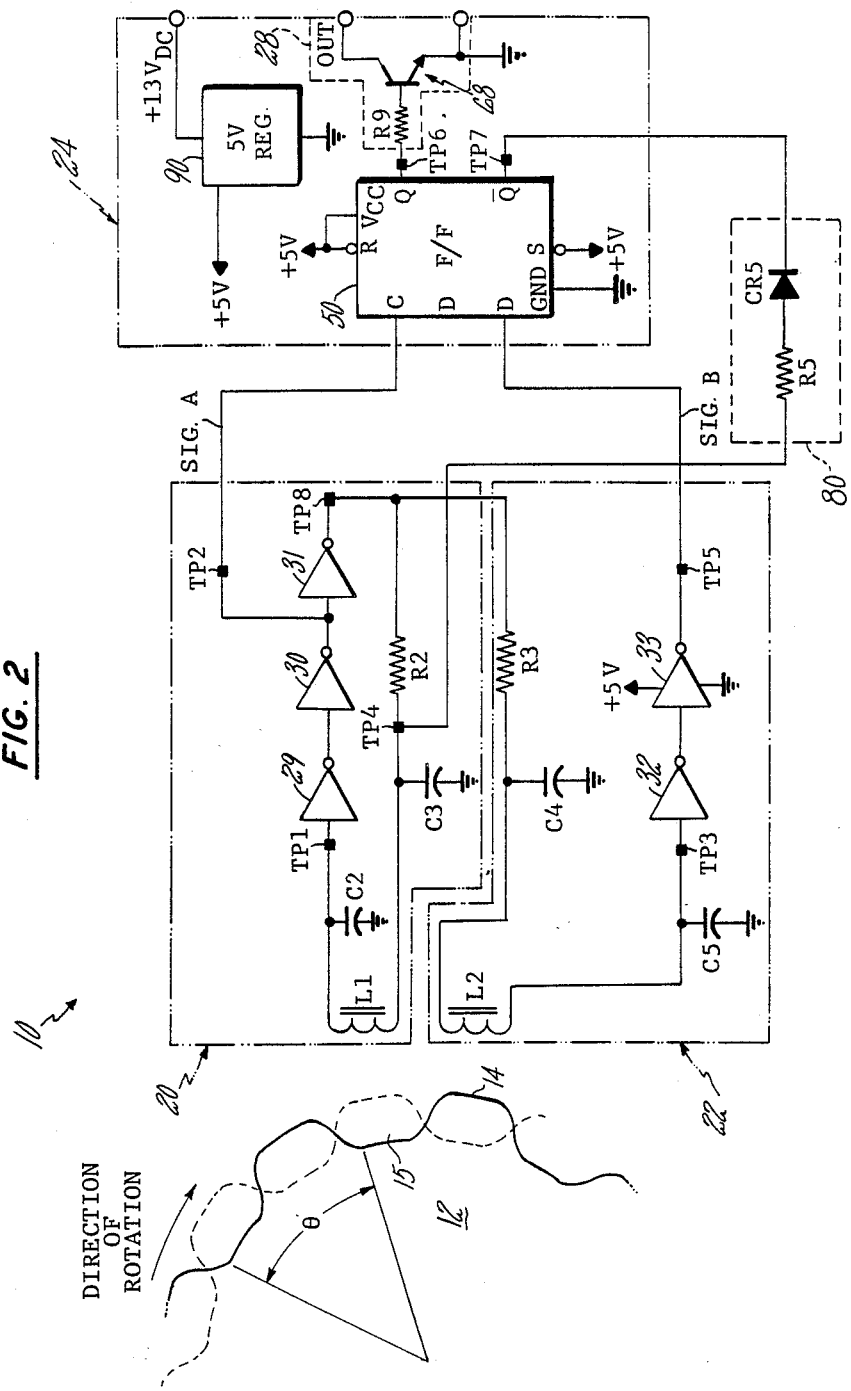
FIG. 2 is a detailed schematic diagram of the detector of FIG. 1 showing the tone wheel adjacent thereto in each of two different positions.

Attention is now directed to the detailed schematic diagram of FIG. 2 for a clearer understanding of the speed detector 10 and particularly, the associated hysteresis control circuitry 80. For purposes of comparison, the elements of FIG. 2 which find identical counterparts in the aforementioned U.S. Ser. No. 07/240,782 (HCI-386) have been given the same reference numerals or letters in FIG. 2. The iron-cored inductive sensing coil L1 is seen to be included as part of the phase sense oscillator 20. The inductive coil L1 is, for example, several hundred turns of enameled wire, wound on one half of a toroidal core. The resistance of coil L1 is several ohms. Its normal inductance is approximately 1.5 millihenrys (mh). Phase sense oscillator 20 is designed to operate at a frequency which is well above the audio range, but is not likely to cause radio interference. In the illustrated embodiment, the oscillator has a frequency near 20 KHz and will be seen to vary slightly about that frequency as a function of the changing inductance of L1 as the tone wheel 12 rotates.

In this embodiment, phase sense oscillator 20 includes a pair of inverters 29 and 30 arranged in tandem and serving as active elements for providing gain in the circuit. A further inverter 31 in series with inverter 30 effects a 180° phase shift, and the remaining 180° phase shift for the oscillator is provided by the filter network which includes inductor L1, capacitors C2 and C3, and resistor R2. Because of the amplification afforded by the inverters 29 and 30, the output of inverter 30 is a digital or pulse-type signal of square waveform and is designated SIG A. The square wave out of the inverter 31 is filtered by the network of R2, C3, L1 and C2 such that it assumes a sinusoidal form and is greatly attenuated. As mentioned, the tandem inverters 29,30 subsequently amplify and digitize that sinusoidal waveform to provide SIG A.

The tuned sensor network 22 might alternatively be viewed as a low-pass filter or a phase shift network. In any event, network 22 is driven by phase sense oscillator 20 via its connection to the output of inverter 31. Network 22 includes, in addition to the inductive sensing coil L2, a filter network including resistor R3 and capacitors C4 and C5. As with the phase sense oscillator 20, the sensor network 22 also includes a pair of inverters 32 and 33 arranged in tandem for amplifying and squaring the sinusoidal signal developed prior thereto in that circuit. The output of inverter 33, and thus of sensor circuit 22 is a digital or pulse-type signal of square waveform and is designated SIG B.

It is highly desirable that the filter elements of the sensing network 22 have component values which are substantially identical to their counterparts in the phase sense oscillator 20. For instance, R2 should equal R3 and the values of C2 and C3 should equal one another and should correspondingly equal the values of C4 and C5. Similarly, the natural inductances of L1 and L2 should be substantially identical in a given identical ambient condition such as in open air. In one embodiment, resistors R2 and R3 have values of about 3.3 K ohm, capacitors C2, C3, C4 and C5 had values of 0.1 uf and each of the inductors L1 and L2 had values of about one mh. Thus, SIG B will be like SIG A in appearance but will usually be phase-shifted therewith as will be better understood hereinafter.

As a tooth 14 passes beneath a particular coil L1 or L2, the inductance of that coil changes and more specifically, increases. Conversely, as the coil moves away from the tooth and over a slot 15, its inductance decreases. If, instead, eddy current principles were involved, the effect would be reversed. Ideally, both coils L1 and L2 will be in resonance at mid-transition, that is, when both coils L1 and L2 and their associated cores 16 and 17 are subjected to the identical conditions caused by the positioning of the teeth 14 and the slots 15. The oscillator coil L1 will always work in resonance because the frequency of that circuit will shift as required to maintain 180° phase throughout that network. Thus, as a tooth approaches L1 and its inductance increases, one would expect to see the frequency of the oscillator 20 decreases somewhat. On the other hand, the sensor network 22 is operating off resonance most of the time except for the those instances in which the physical conditions presented to the two coils are identical.

The difference in operating frequencies between the circuits of oscillator 20 and network 22 manifest themselves as a phase shift between the resulting output signals SIG A and SIG B. Moreover, since the frequency of oscillator 20 is not constant but may vary as a function of the inductance of L1, the resulting shift in phase between the output signals SIG A and SIG B is doubled. Stated another way, if oscillator 20 and network 22 are operating at a common resonant point because both coils L1 and L2 are experiencing the same conditions with the tone wheel, then as the inductance of L1 changes to change the frequency of oscillator 20, the inductance of coil L2 will change in the opposite direction by a corresponding amount to double the magnitude of the phase shift. The use of a pair of inductive coils L1 and L2 connected in the respective circuits 20 and 22, each having components of similar value, also results in an inherent temperature compensation.

The output signals SIG A and SIG B from phase sense oscillator 20 and tuned circuit 22, respectively, may be monitored at test points TP2 and TP5. Moreover, those signals serve as the two inputs to the phase condition detector 24. In the present embodiment, the phase condition detector 24 is simply and conveniently provided by a D-type flip-flop 50 having one of signals SIG A and SIG B connected to its clock input, C, and the other signal connected to its data input, D. In this embodiment, SIG A from phase sense oscillator 20 is connected to the C input of flip-flop 50 and SIG B from tuned circuit 22 is connected to the D input. It will be appreciated that such arrangement is an arbitrary reversal of the connections made to the corresponding flip-flop 50 in the aforementioned application Ser. No. 07/240,782 (HCI-386).

It is the function of the flip-flop 50 to detect the event of phase reversal between the signals, SIG A and SIG B. With the positive transition of the pulse waveform of SIG A serving to clock the C input of flip-flop 50, the Q output of the flip-flop will assume the same state as the D input at the instant the clocking transition is applied to the C input. Thus, if SIG B had moved to a logic high state prior to SIG A making the same transition, the Q output of flip-flop 50 would assume a logic high state. Correspondingly, if SIG B is low at the instant that SIG A goes to the logic high state, the resultant state of the Q output will be a logic low value. In this way, so long as a particular one of SIG A and SIG B leads the other, the Q output of flip-flop 50 will assume a particular logic state, either high or low. However, immediately upon reversal of that phase sequence of SIG A and SIG B, the logic state of the Q output will reverse. It is that transition in logic state which is ultimately used to provide a timing reference output indication.

With SIG A and SIG B connected as shown in FIG. 2, the Q output of flip-flop 50 will go to a high logic state the first time SIG B leads SIG A and will remain at that state so long as SIG B continues to lead SIG A. The first time that situation reverses and SIG A leads SIG B, the Q output of flip-flop 50 will transition to the low logic state and will remain there throughout that phase relationship. In the unlikely, but possible, instance of a coincidence of the phases of SIG A and SIG B, flip-flop 50 will remain in its previously existing state.

An output buffer circuit 28 comprised of resistor R9 and transistor 68 are connected to the Q output of flip-flop 50 to provide a buffered output signal, albeit inverted relative to output Q of the flip-flop. A voltage supply circuit 90 converts an input supply voltage of +13 volts into a regulated +5 volt supply for use by the flip-flop 50 and by the various CMOS inverter elements 29–33 in oscillator 20 and sensor network 22.

According to the invention, switching hysteresis is provided via the inclusion of a hysteresis control circuit 80 comprised of a resistor R5 and optional diode CR5 connected in series between an output of flip-flop 50 and an appropriate location in the circuitry which provides SIG A and SIG B. The advantages of the invention are realized by connecting hysteresis circuit 80 between the phase sense oscillator 20 and the $\overline{Q}$ output of flip-flop 50. More specifically still, the connection of the hysteresis circuit 80 with the circuit of phase sense oscillator 20 occurs at TP4 intermediate the resistor R2 and capacitor C3 of the oscillator network. Briefly, the inclusion of hysteresis circuit 80 serves to increase the apparent phase shift between SIG A and SIG B under certain conditions to minimize or prevent an unwanted reversal of the phase of those two signals in the event backward displacement, or backlash, of tone wheel 12 occurs when it is rotating slowly or is stopped. Hysteresis circuit 80 effects the "jump shift" in the phase shift between SIG A and SIG B in the following manner.

When the $\overline{Q}$ output of flip-flop 50 moves to its low logic state (and the Q output is in its high logic state), the diode CR5 is poled in a direction to conduct current between the phase sense oscillator 20 and the near-ground potential of the $\overline{Q}$ output of the flip-flop. Typically, the current drawn by circuit 80 is relatively small and is determined principally by the magnitude of resistor R5, which in the present embodiment is 2.2 meg-ohm. It would be possible to use only a constant resistance in hysteresis circuit 80, in which case active hysteresis would exist for phase reversal in both directions. However, since such hysteresis is not necessary and tends to degrade performance of the detector, the diode CR5 serves to introduce the effects of the hysteresis circuit only following the phase reversal which results in the positive-going transition of output Q of flip-flop 50 which is used as the timing reference output indication. Thus, when the opposite phase reversal occurs, causing the $\overline{Q}$ output to transition high, the diode CR5 is reverse-biased and no active hysteresis is introduced since no current flows through resistor R5. This arrangement further allows the use of resistor R5 having relatively lower ohmic values than would otherwise be the case, thus minimizing the need to use certain very high resistances which may be relatively more expensive.

At this juncture, it is appropriate to understand that the circuit of phase sense oscillator 20 normally operates at a DC voltage level of about 2.5 volts, which is approximately one half the 5 volt DC supply voltage to the inverters 29, 30 and 31 and also corresponds to the input threshold voltage of those CMOS inverters. The same situation may be said to apply to the tuned network 22. It is this DC voltage which is altered, in this case reduced, by the drain of current through the hysteresis circuit 80. The resulting change in the level of the DC voltage in the oscillator circuit 20 finds its way into a modification of the duty cycle of the pulsed square waveform provided as SIG A and viewed at TP2. More specifically, as the DC voltage level of oscillator circuit 20 is decreased, the duty cycle of the square waveform pulse is also reduced.

Figure 3:
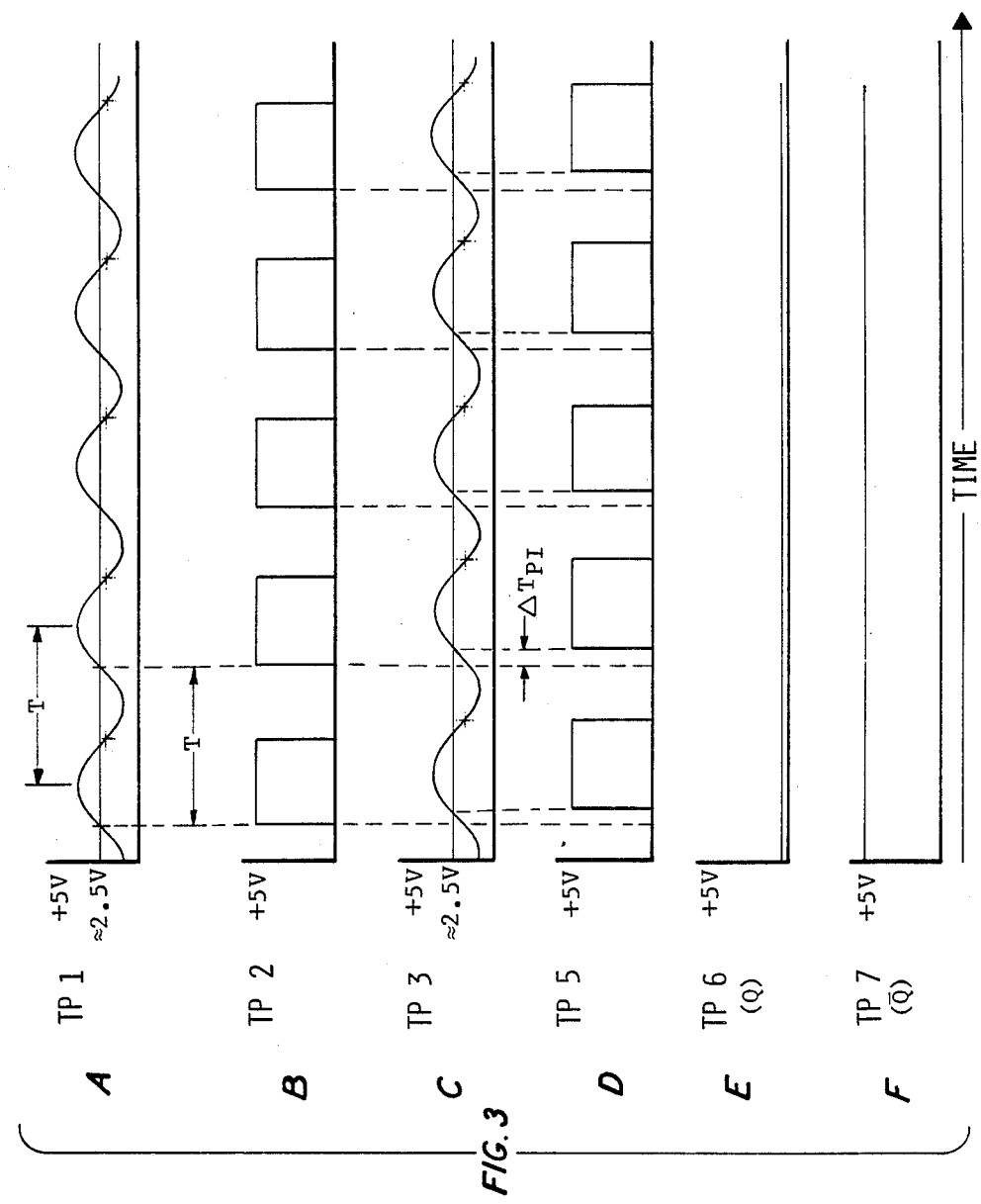
FIG. 3 depicts various waveforms present at various test points (TP) in the circuit of FIG. 2 for the solid-line position of the tone wheel in FIG. 2.

At this juncture is will be appropriate for a better understanding of the invention to direct attention first to FIG. 3 and ultimately to FIG. 4. Referring to FIG. 3, various waveforms are depicted for the signals appearing at selected test points identified as TP1, TP2, TP3, TP5, TP6 and TP7 in the schematic of FIG. 2. The waveforms of FIGS. 3A–3F are for the condition of tone wheel 12 shown in solid line in FIG. 2 in which coil L1 is aligned with a slot 15 and coil L2 is aligned with a tooth 14. The 20 KHz sinusoidal signal in oscillator 20 appears at TP1 and has a period designated T.

The input threshold of inverter 29 required to switch its respective output to the low state (0 volt) and is slightly below 2.5 volts for switching to the high state (+5 volt). Waveform 3B is taken at TP2, which includes a second inverter 30 inverting the output of the first inverter 29. The waveform of 3B is SIG A herein and thus is shown as going to the logic high state when TP1 is at substantially 2.5 volts and returning to the low logic state when TP1 falls slightly below 2.5 volts. FIG. 3C depicts the signal at TP3 in the tune network 22 and reveals a sinusoidal signal shifted somewhat in phase from that of FIG. 3A as a result of the different positionings of the coils L1 and L2 relative to tone wheel teeth 14 and slots 15. FIG. 3D, like FIG. 3B, depicts the conversion of the sinusoidal waveform into pulses of a square waveform. As with oscillator circuit 20, the inclusion in circuit 22 of two inverters 32 and 33 provides the resulting waveform in FIG. 3D which transitions to a logic high state when the 2.5 volt threshold is exceeded and which returns to the logic low state when the signal of FIG. 3C decreases somewhat below 2.5 volts. It will be noted through a comparison of the wave fronts of the pulses in FIG. 3D with 3B that they are phase shifted represented by $\Delta T_{P1}$ and determined by the depicted instantaneous position of tone wheel 12. In such condition, SIG A appearing in FIG. 3B leads or precedes SIG B appearing in FIG. 3D. Accordingly, when the positive transition of SIG A appears on input C of flip-flop 50, the D input of that flip-flop will still be at a logic low value and the Q output will thus be in the logic low state as depicted in FIG. 3E. Correspondingly, the $\overline{Q}$ output of flip-flop 50 will be in the logic high state depicted in FIG. 3F.

Referring to FIGS. 4A–4F (including 4B'), it should be noted that the associated signal waveforms are for the condition in FIG. 2 in which the tone wheel 12 is represented in broken line, with a tooth 14 aligned with coil L1 and a slot 15 aligned with coil L2. The broken-line waveforms in FIGS. 4A–4D represent the conditions of those waveforms without the presence of the hysteresis circuit 80, whereas the solid line waveforms represent their conditions with the hysteresis circuit present. Referring first to the condition in which hysteresis circuit 80 is not present, FIGS. 4A, 4B, 4C and 4D represent the same test point positions as those corresponding Figures in FIG. 3. On the other hand, since the relative position of a tooth 14 and a slot 15 with respect to the coils L1 and L2 has been reversed with respect to the condition for the FIG. 3 diagrams, it will be noted that SIG B in FIG. 4D now leads SIG A in FIG. 4B. The magnitude of that phase difference is designated as $\Delta T_{P2}$ in the waveform trace of FIG. 4D.

Now, reference is made to the solid line waveforms in FIGS. 4A–4D which represent those signals with the hysteresis circuit 80 connected in speed detector 10 as shown in FIG. 2. Since SIG B in FIG. 4D leads SIG A of FIG. 4B even without the presence of hysteresis circuit 80, the Q output of flip-flop 50 is at a logic high of 5 volts and the $\overline{Q}$ output is at a logic low level near ground. Thus, diode CR5 is poled such that it conducts and a small portion of the current in oscillator 20 is shunted therethrough to ground via the $\overline{Q}$ output of the flip-flop. That has the effect of lowering the DC voltage in the oscillator circuit 20 from 2.5 volts to a somewhat lower value by the amount designated $\Delta V_1$. This has the effect of shifting the sinusoidal waveform in FIG. 4A downward by $-\Delta V_1$, such that only a narrower portion of the waveform now exists above the 2.5 volt threshold at which the inverters 29 and 30 operate. The result is the narrowed solid-line pulses of FIG. 4B, which comprise SIG A.

However, because the signal appearing at TP2 is further inverted by inverter 31 in oscillator circuit 20 before being supplied to tuned network 22, it will appear at TP8 (FIG. 4B') in a form which is inverted relative to that of FIG. 4B. Thus, although the pulses of SIG A were narrowed by the addition of hysteresis, their value as inverted at TP8 in FIG. 4B' is correspondingly widened. The widening of the pulses at TP8 serves to correspondingly increase the DC voltage of the resulting filtered signal in tuned network 22 as it appears at TP3 and depicted in FIG. 4C. The magnitude of that increase in the DC voltage is represented by $+\Delta V_2$. Similarly, since the DC voltage in tuned network 22 has now increased, a greater percentage of its sinusoidal waveform will be above the 2.5 volt threshold of inverters 32 and 33, such that the resulting square wave pulses in FIG. 4D at TP5 are widened. Such narrowing of the SIG A pulses in FIG. 4B and widening of the SIG B pulses in FIG. 4D serves to further increase the magnitude of the apparent phase shift or difference between those two signals. This may be seen wherein the hysteresis-created shift of $\Delta T_{H1}$ for SIG A and $\Delta T_{H2}$ for SIG B is added to the "natural" phase difference of $\Delta T_{P2}$. Thus, the total phase difference with hysteresis present is represented by $\Delta T_{PH}$.

It is important that the increased phase shift resulting from the hysteresis circuit and represented by shift displacements $\Delta T_{H1}$ and $\Delta T_{H2}$ will result immediately after the occurrence of the phase shift reversal which resulted in the Q output of flip-flop 50 going high. Thus, if tone wheel 12 were stopped or moving very slowly at that condition, the additional phase shift provided by hysteresis would be expected to be sufficient to prevent some small backward displacement of the tone wheel from being sensed as a further phase shift reversal. It should also be understood that when the hysteresis circuit 80 "drops out" upon the eventual phase shift reversal in the opposite direction, such action effectively provides an abrupt phase-shift jump in that opposite sense (but only to a neutral condition if diode CR5 is present).

The magnitude of instantaneous phase shift provided by the inclusion of the hysteresis circuit 80 can be adjusted or preselected by controlling the value of the resistance in that circuit so that it will exceed the range of undesired phase shifts caused by vibration or backlash movement of the tone wheel 12. An increase in the circuits resistance will decrease the amount of phase shift introduced by hysteresis circuit 80, whereas a reduction in that value will increase the hysteresis value.

Figure 2A:
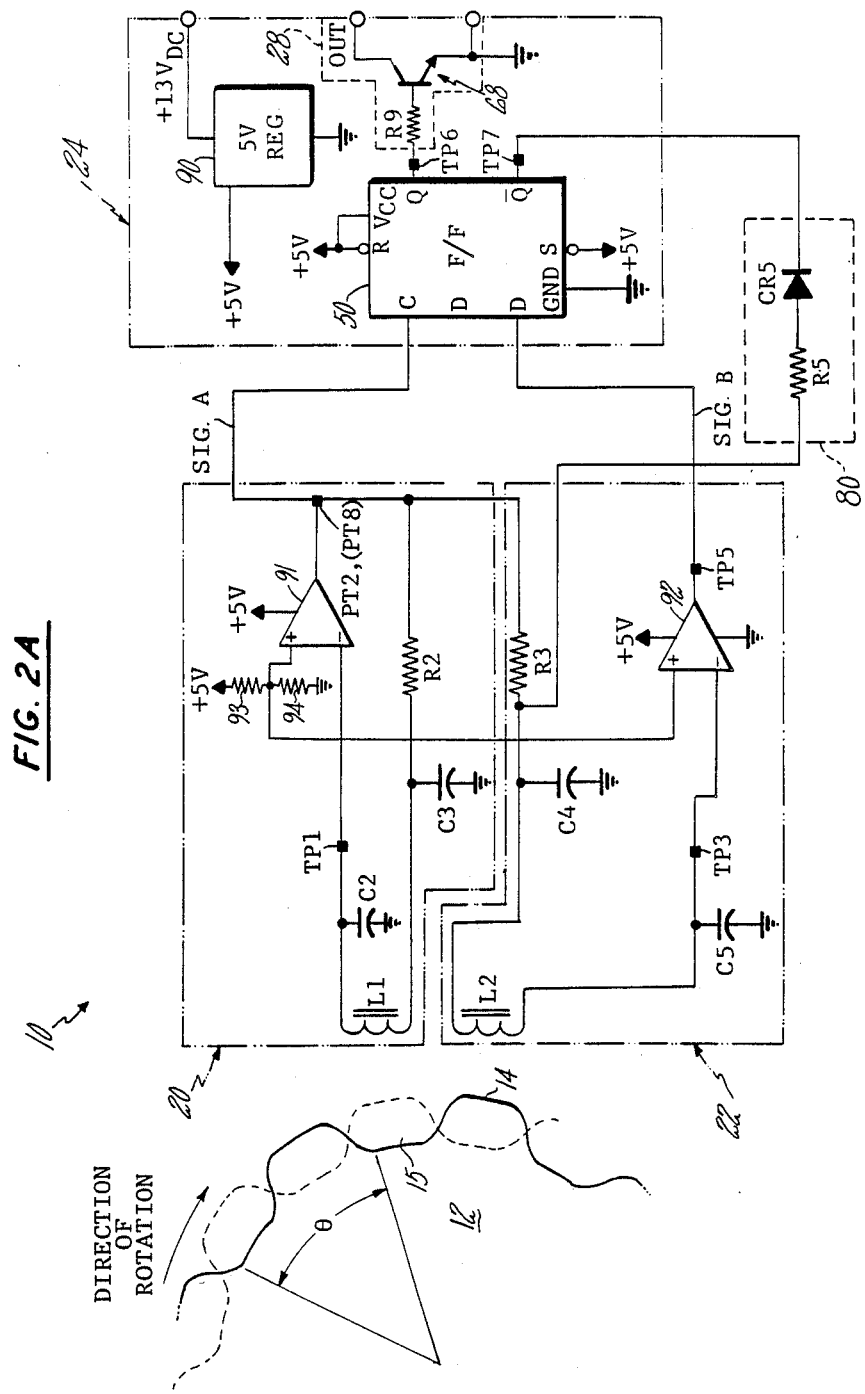
FIG. 2A is a detailed schematic diagram similar to FIG. 2, but showing an alternate embodiment of the detector.

Reference is now made to FIG. 2A for an alternate, and perhaps preferred, arrangement of the phase sense oscillator 20 and the tuned sensor network 22 and the interconnection of hysteresis circuit 80 therewith. In the main, the inverters 29, 30, 31, 32 and 33 of FIG. 2 have been replaced with comparators 91 and 92 in FIG. 2A. While inverters are basically capable of providing the requisite "squaring" and buffering function of the analog waveform, that function is handled even more effectively and with less power dissipation by comparators which are intended to convert analog signals to digital form.

In FIG. 2A, the analog signal at TP1 is connected to the "−" input of comparator 91 and a reference voltage of 2.5 V DC is connected to the "+" input of that comparator. The reference voltage is provided by a voltage divider comprised of resistors 93 and 94 of equal value and connected in series between +5 V. and ground. The digitized output of comparator 91 now comprises SIG A appearing at TP2. It will be noted that former TP8 of FIG. 2 is parenthetically depicted as also being at TP2 since although it remains the input to the phase shifting circuitry of both the oscillator 20 and the tuned sensor network 22, it no longer is inverted relative to TP2. Next, the analog signal at TP3 in the tuned sensor network 22 is now connected to the "−" input of comparator 92 and the 2.5 V DC reference voltage is connected to the "+" input. The digitized output of comparator 92 now comprises SIG B appearing at TP5. Finally, the hysteresis circuit 80 is connected to the tuned sensor network 22 at the junction between resistor R3 and capacitor C4. This configuration is functionally equivalent to that depicted in FIG. 2, and would similarly be functionally equivalent if the polarities of the input to comparator 92 were reversed and the connection of hysteresis circuit 80 were moved from the junction of C4 and R3 to the junction of C3 and R2.

It should be understood that the invention is not limited to the particular embodiments shown and described herein, but that various changes and modifications may be made without departing from the spirit and scope of this novel concept as defined by the following claims.

I claim:

1. A speed detector apparatus for use in combination with a tone wheel having multiple metal teeth, the detector apparatus and tone wheel being adapted for relative displacement and further being susceptible to relative backward displacement, comprising:

an oscillator including a first inductive sensing coil adapted to be positioned adjacent to passing teeth on said tone wheel to thereby change inductance, the oscillator having a first output signal having a frequency determined at least partly by the inductance of said first coil, the oscillator further including means for providing said first output signal as a digital pulse waveform, the duty cycle of said digital waveform being at least partly a function of the DC voltage of the oscillator;

a tuned circuit interconnected with said oscillator and including a second inductive sensing coil, said tuned circuit being driven by said oscillator to provide a second output signal and said second inductive sensing coil being adaptive to be positioned adjacent to passing teeth on said tone wheel to thereby change inductance, the tuned circuit including means for providing said output signal as a digital pulse waveform, the duty cycle of said digital waveform being at least partly a function of the DC voltage of the tuned circuit;

said first and said second inductive sensing coils being offset from one another relative to the passing teeth on the toned wheel, such that their respective said changes of inductance are relatively out-of-phase;

the phase of said second output signal relative to said first output signal shifting and reversing cyclically as a function of the relative positioning of said teeth to the respective said first and second sensing coils during said relative displacement of the tone wheel;

means coupled to said oscillator and said tuned circuit for detecting a said reverse of said phase of one of said first and said second output signals relative to the other and thereby providing timing reference signals recurring at intervals representative of the relative speed of said tone wheel; and hysteresis circuit means connected between said phase-reversal detecting means and at least one of said oscillator and said tuned circuit for automatically adjusting said DC voltage of the respective said oscillator or said tuned circuit upon said detection of a phase reversal to thereby increase the magnitude of the phase shift.

2. The speed detector apparatus of claim 1, wherein said hysteresis circuit means adjusts the level of DC voltage in both said oscillator and said tuned circuit to increase the magnitude of the said phase shift.

3. The speed detector apparatus of claim 2, wherein said phase-reversal detecting means is a bistable logic element having complementary outputs and said hysteresis circuit means is connected to one of said outputs of said phase-reversal detecting means and includes resistance means for limiting current flow.

4. The speed detector apparatus of claim 3, wherein said hysteresis circuit means further includes unidirectional conducting means in series with said resistance means.

5. The speed detector apparatus of claim 4, wherein said unidirectional conducting means is a diode, said diode being connected for conduction when said bistable element output is substantially at ground potential to thereby lower the DC voltage in the respective said oscillator or tuned circuit to which said hysteresis circuit means is connected.

6. The speed detector apparatus of claim 5, wherein said resistance means limits the amount by which said DC voltage is lowered.

* * * * *